Figure 1:
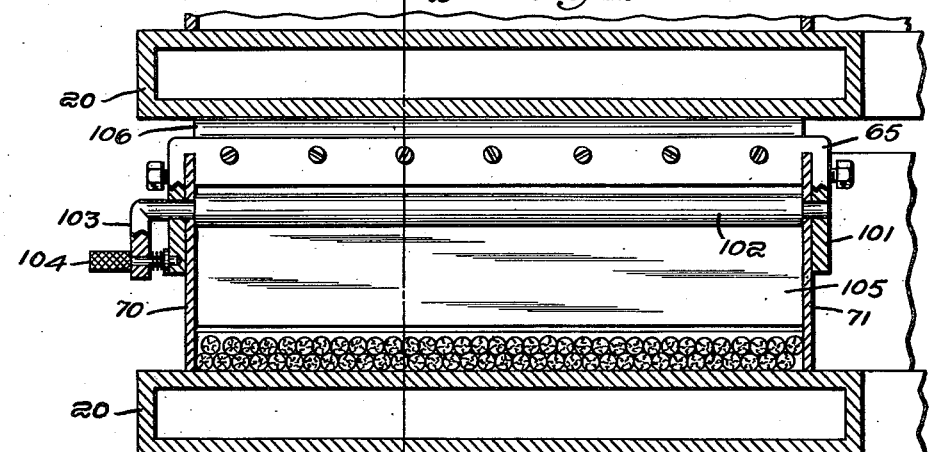

May 11, 1943.     C. BIRDSEYE     2,318,736
ART OF TREATING FOOD PRODUCTS
Filed July 19, 1940

Inventor:
Clarence Birdseye
by Kenway & Witter
Attorneys

Patented May 11, 1943

2,318,736

UNITED STATES PATENT OFFICE 2,318,736

ART OF TREATING FOOD PRODUCTS

Clarence Birdseye, Gloucester, Mass., assignor to Mechanical Research, Inc., Providence, R. I., a corporation of Rhode Island Application July 19, 1940, Serial No. 346,376

26 Claims. (Cl. 62—114)

This invention relates to the freezing or quick freezing of solid or liquid food products or combinations of such products. In one aspect the invention consists in improvements in the quick freezing apparatus and process disclosed in my prior Patents No. 2,229,000, No. 2,228,999, both dated January 14, 1941. In another aspect it consists in improvements of general application to apparatus and processes for freezing food products by moving them along and in direct contact with refrigerated surfaces.

For purposes of illustration the invention will be described as carried out in connection with the apparatus of my said prior patents. That apparatus includes a series of flat horizontal refrigerated plates disposed in spaced relation one above another and having staggered openings or passages whereby the product may be delivered from one plate to the next. Upon the refrigerated surfaces of these plates are arranged movable scrapers which are effective to separate the product from the surface without damage to the product, to lift the product in advancing areas from the refrigerated surfaces so that a wave or wave crest is formed therein, and to advance the mass of product at a slower rate toward the opening in the plate by which it is delivered to the next lower plate in the series. Carbon dioxide or other non-oxidizing gas may be introduced into the apparatus and this gas may be refrigerated if desired so that it acts as a secondary refrigerating medium. Lifting the product mass temporarily in limited areas from the refrigerating surface forms a forwardly moving wave crest in the mass and thus stirs the units thereof so as to cause some of them to shift position from the lower part of the layer in contact with the refrigerating surface to the upper part of the layer where they are exposed more fully to the refrigerating effect of the gas.

Experience has shown that efficiency of operation of this type of apparatus is greatly increased by properly setting up and continuously maintaining on each of the several plates of the apparatus, a uniform product-layer of suitable thickness. The optimum thickness of this product layer may vary with different products, being thinnest with liquids and free-flowing products consisting of relatively small units such as peas, and thickest in the case of such large products as shrimp and smelts. Moreover, the thickness of the product layers on the several plates may advantageously differ, being, for instance with peas, much thicker layers on the lower three plates than on the top plate. Also, it is important to prevent too great piling up of the product on any of the plates after it has fallen through the opening in the plate next above.

With the above consideration in view, an important feature of my invention consists in product-leveling sweeps, herein shown as plates or blades arranged to travel along over the upper surfaces of the refrigerated plates at predetermined and preferably adjustable distances therefrom. There may be one or several of such sweeps operating above each or any plate. They constitute an effective and positive means of quickly establishing product-layers of any desired thickness on all of the plates of the apparatus; of moving forward and distributing over each of the plates product falling thereon from the plate next above; of maintaining product-layers of desired thickness on each plate; and of controlling the speed of the flow of the product through the apparatus.

When the product being frozen consists of a mass of separate, delicate units such as peas or lima beans, the leveling means above mentioned must sweep the product over the plate without pressing it downward toward the plate and so compacting the mass and injuring the units thereof. On the contrary, when liquid or semi-liquid products such as cream are being frozen, a primary purpose of the leveling sweeps is to crush downward against, and spread evenly over, the plates the masses of slushed product often built up by the action of the plate scraping means. The more compactly the slush is pressed against the plate and the more evenly it is spread over the plates the more efficient will be the heat transfer from the slush to the plate.

In order to meet the above conditions the leveling means as herein described is made in the form of a thin plate or blade extending between the inner and outer product-confining walls in such a manner that its lower edge may be swung in an arc either forwardly in the direction of the product movement or backwardly in the opposite direction. The leveling sweep is swung forwardly for handling such small, delicate products as green shelled peas and backward where products such as slushed cream are to be crushed and leveled against the plates. Preferably the bottom edge of the sweep will be approximately in contact with the plate surface when the sweep is adjusted in a vertical position at right angles to the plane of the plate. The distance between the lower edge of the leveling sweep and the upper surface of the plate will determine the thickness of the layer of the product brought about by the action of the sweep and may be regulated by moving the lower edge of the sweep forward or backward through any desired arc. When the sweep is in a vertical position it may be used to clear rapidly from the plate product resting thereon and so empty the apparatus in a minimum time.

Still another feature or characteristic of the invention consists in scraping frost from the under surface of the refrigerated plates continuously while the apparatus is in operation. This not only maintains the efficiency of the refrigerated surface as a means of cooling gas within the apparatus, but returns to the product in the form of frost crystals or ice particles moisture which has been removed from it by evaporation. By this means the aggregate moisture content of the product, including the film of moisture surrounding each unit of a mass of product such as shelled green peas, is maintained or constantly renewed throughout the progress of the product in the apparatus so that the product after being frozen and placed in cold storage suffers a minimum of harmful desiccation. As herein shown the frost-removing means may comprise a spring blade arranged to travel with its edge in yielding contact with the under surface of the plate to be scraped.

In the freezing of certain products it is desirable to maintain within the apparatus an atmosphere of refrigerated gas, to hasten the freezing of the product. This secondary refrigerating medium may advantageously be a non-oxidizing gas and the capacity of the apparatus may be increased by feeding into and mixing with the product a low temperature solidified gas such as crushed Dry Ice or $CO_2$ snow or by causing an inert gas such as $CO_2$ or pure nitrogen to become absorbed by and intermingled with the product. To this end the apparatus herein shown provides means for expanding liquefied $CO_2$ into the space or spaces between one or more of the pairs of plates; and this expansion may be so arranged that a part of the expanding liquid or vapor will solidify in the form of $CO_2$ snow and become mixed with the product, thereby extracting heat from it and surrounding it with an atmosphere of inert gas.

Figure 2:
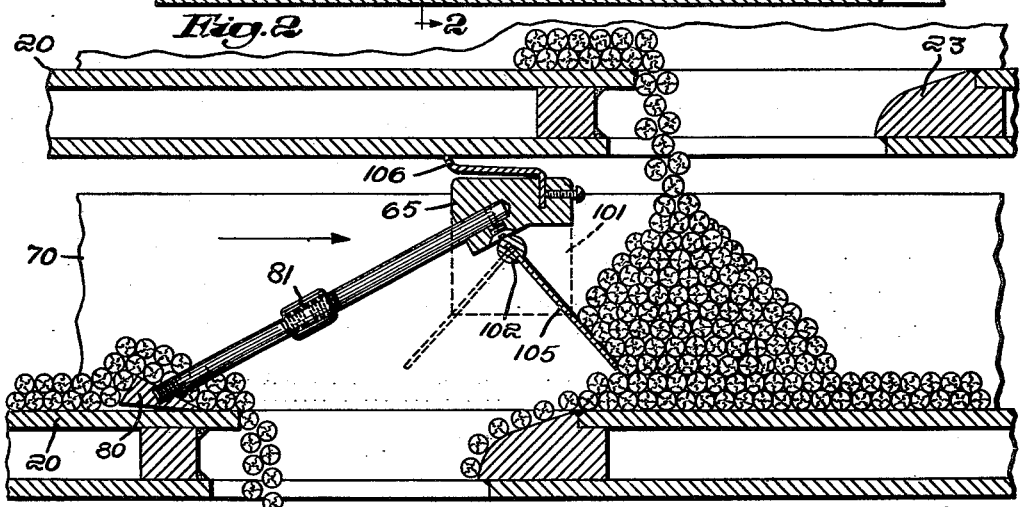
Figure 3:
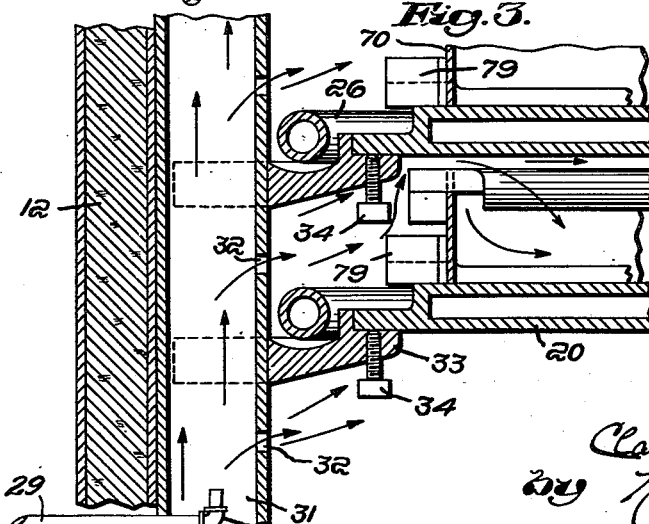
Figure 4:
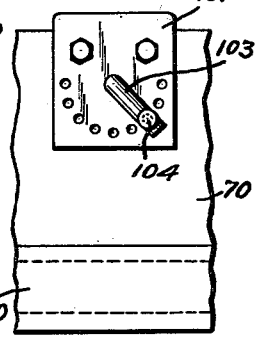

These and other features and characteristics of the invention will be best understood and appreciated from a description of a preferred embodiment of the improved apparatus selected for purposes of illustration, and shown in the accompanying drawing in which, Fig. 1 is a fragmentary view in elevation, partly in section, showing one of the sweeps or leveling blades in its relation to adjacent refrigerated plates, Fig. 2 is a sectional view on the line 2—2 of Fig. 1, Fig. 3 is a fragmentary sectional view illustrating the path taken by the refrigerating vapor in reaching the product, and Fig. 4 is a fragmentary end view showing the sweep adjusting mechanism.

In the accompanying drawing portions of two refrigerating plates 20 only are shown. As described in my prior patents above identified, these refrigerated plates are adjustably supported on brackets 33. They are annular in shape, several feet in diameter and arranged in a series of eight to twenty disposed in vertical alignment. Each of the plates is hollow and is connected in circuit with a supply of refrigerant which may be ammonia or brine refrigerated to a temperature of approximately —40° F. In the walls of the apparatus are provided a number of vertical ducts 31 only one of which is shown in Fig. 3. Through some of these ducts pass the pipes included in the liquid refrigerant circuit while others may be utilized for the circulation of air or $CO_2$.

Each of the plates is provided with an opening, such as the opening 23 shown in Fig. 2, through which the product may fall from one plate to another after it has been passed around and in direct contact with its surface. The fresh product is supplied continuously by a conveyor or the like to the uppermost plate 20 of the series and after having been passed around upon its surface, it falls through an opening 23 to the next lower plate, and so on, making practically an entire circuit of each plate before it is dropped to the next.

In the central space provided by the annular plates is a vertical shaft carrying a series of driving arms. The product is maintained in a circular zone upon the refrigerated surface of each plate by annular walls 70 and 71. In some cases these walls are rotated by connection with the arms of the central shaft already referred to and in other cases the walls remain stationary in the apparatus. As herein shown, however, the walls 70 and 71 are rotated and carry with them bridge members 65. These bridge members carry one or more scrapers 80 each comprising a blade tapering forwardly to a sharp edge which is maintained in continuous contact with the refrigerated surface of the plate, and being thickened on its rear edge. The scraper is dragged behind the bridge 65 by one or more sectional rods, adjustable for length by reason of a right and left hand coupling 81 contained therein. As the bridge 65 is rotated the scraper 80 is advanced and acts to separate the product from the refrigerated surface, severing the thin film of ice between the product and the surface and in no way damaging the product even when handling such delicate units as raw oysters. At the same time it creates an advancing wave crest in the product, as shown in Fig. 2, and also has the function of advancing the mass at a rate slower than the rate of wave movement.

Scraping means of any suitable construction may be employed for scraping frost from the under surface of the refrigerated plates 20. As herein shown a flexible metal blade 106 is secured in a groove in the upper wall of the bridge member 65 and bent so that its edge is yieldingly engaged with the adjacent under surface of the next higher plate 20. The blades 106 are longer than the openings 23 and are thus guided across these openings without obstruction. The blades act to keep the plate surfaces free of any accumulation of frost and to return to the mass of food product part of the moisture which has been temporarily removed therefrom by the dehydrated atmosphere surrounding the product.

As therein shown one of the bridge members 65 is provided at both ends with downturned end plates 101 lying outside the walls 70 and 71 respectively and provided with bearings for a transverse shaft 102. At its outer end the shaft 102 carries an arm 103 provided with a spring plunger 104. The plunger cooperates with a series of circularly arranged holes in the outer end plate 101 and by it the shaft 102 may be rotated and temporarily located in any desired angular position.

A sweeper blade or plate 105 projects downwardly from the shaft 102. When the arm 103 is set to maintain the sweeper plate or blade 105 in vertical position, its lower edge just clears the surface of the underlying refrigerating plate 20 and its function in such setting is to sweep all the product ahead of it in clearing the apparatus, preparatory to refrigerating a different product.

In handling such a product as peas or beans the sweeper plate may be set at a forward inclination, such as that suggested in Fig. 2, so that its lower edge is disposed a predetermined distance above the surface of the refrigerating plate. Under these circumstances the sweep moves along at a fixed height above the plate leveling the product thereon so as to maintain, for example, a layer two units deep as shown in Fig. 2. The sweeper plate thus acts effectively and immediately upon delivery of the product to dispose of any piled up product and level it off in the manner explained. On the other hand, in dealing with a semi-solid or slush product the sweeper plate may be set at a rearward inclination such as that suggested in dotted lines in Fig. 2 whereupon it operates to level the product as before, but also to crush or compact it with more or less pressure against the surface of the refrigerated plate.

As already suggested, the plates 20 may be refrigerated to a temperature of $-40°$ F. or lower by the circulation of brine or by the direct expansion of ammonia or other refrigerant therein. The atmosphere within the apparatus, air, $CO_2$ or any desired mixture of gases, is chilled to a temperature substantially below that of the product being treated, circulated in the spaces between the plates and simultaneously chilled by contact with the under side of the plates, and is partially dehydrated by giving up moisture to said plates. The chilled gas may be circulated in the apparatus in any desired path and is effective to remove heat from the product over which it passes. As already explained the path shown for illustrative purposes is upwardly adjacent to the outer circumference of the plates, inwardly across the product supported upon the plates and downwardly around the shaft.

Fig. 3 illustrates the path of the $CO_2$ vapor in passing from one of the vertical ducts 31 out through the openings 32 and into the space between adjacent refrigerating plates. As it expands in passing inwardly from a supply pipe 29 upwardly through the openings 32, it solidifies in the form of fine $CO_2$ particles and these fall upon the product and become intimately distributed therein.

The refrigerating medium may be delivered to the respective plates in accordance with any desired plan. In accordance with one satisfactory arrangement the amount of heat transfer which takes place at each plate is substantially uniform. Consequently the unfrozen or slightly frozen product raises the temperature of the upper plates in the series to a degree somewhat above that of the lower plates in the series. Each plate, however, is substantially colder than the product upon it and the dehydrated gas circulating over the product is always colder than the product with which it is in contact.

A most important aspect of the present invention is that of maintaining the moisture content of the food product, that is, the moisture within and upon the surface of the product, without substantial reduction during the freezing process. A current of partially dehydrated gas is passed continuously over the product and thus moisture from the product is taken up into the gas. This is congealed upon the exposed refrigerated surfaces within the enclosure of the apparatus, and the congealed moisture is transferred back to the product so as to reestablish substantially its initial moisture content. The cycle thus carried out is believed to be broadly novel, and of course, is not limited to any specific apparatus although the apparatus herein shown is well adapted for its practice and is also novel in the industry.

Leveling elements, exemplified herein by the adjustable sweeps 105, are also believed to be broadly new in the food freezing industry. These elements control the rate of delivery of the food product from one plate to another because they push ahead any product piled up in excess of the layer that can be most advantageously treated, that is, having once established a layer two units thick, for example as shown in Fig. 2, surplus product is carried ahead above this layer in a supernatant feeding movement at the full advancing rate of the sweep and so discharged to the next succeeding plate without delay at a much faster rate than that at which the product layer as a whole is advanced.

When the sweep is set at a forward angle as shown in Fig. 2 it tends to lift the piled-up product and spill it forwardly off the edge of the sweep. On the other hand when the sweep is set at a rearward angle it acts forcibly to crush the product down to the surface of the plate in layer formation. A semi-liquid food product is reduced to a slush upon the surface of the refrigerated plate and by the action of the scrapers it is formed intermittently into lumps or masses of irregular shape. These masses are rearranged and forcibly crushed into layer formation by the action of the sweep, then the layer is disturbed and broken up by the scraper and this cycle continues during the gradual congelation of the product.

The employment of an inert or non-oxidizing gas in the apparatus is particularly advantageous when it is employed for freezing food products which are impaired in flavor or otherwise deleteriously affected by oxidation, such as for example, orange juice, cream, crab flakes, mackerel filet, etc. Mackerel filet ordinarily includes fat which is likely to oxidize and acquire a rancid flavor. This may be obviated by employing an inert or non-oxidizing gas as a secondary refrigerating medium within the apparatus. In some cases it may be advisable to evacuate the product of atmosphere before subjecting it to the freezing process herein disclosed. In such case the product will more readily absorb or take up the non-oxidizing gas within the apparatus and will thus contain occluded inert gas in its interstices which has no oxidizing tendency in respect to the food product.

Having thus disclosed my invention and described a preferred manner of carrying out my novel process, and one form of apparatus well adapted for that purpose I claim as new and desire to secure by Letters Patent:

1. Apparatus of the class described including in its structure a plurality of refrigerated plates, means for advancing a product along the surface of said plates successively, and means for leveling the product upon the plates in layers of predetermined thickness.

2. Apparatus of the class described including in its structure a plurality of refrigerated plates arranged one above another with an opening in each plate, means for advancing a product along the surface of each plate and into the opening therein so that the product may pass by gravity to the next lower plate, and means for carrying the product from the location where it is delivered and distributing it in a layer of substantially uniform thickness over the surface of the respective plates.

3. Apparatus of the class described including in its structure a plurality of refrigerated plates arranged one above another with an opening in each plate, means for advancing a product along the surface of each plate and into the opening therein, and a leveling member arranged to travel at a predetermined height above the surface of a refrigerated plate and to sweep into the opening of the plate surplus product above a predetermined level.

4. Apparatus of the class described including in its structure a series of refrigerated plates for supporting a product to be frozen, in combination with leveling members mounted for movement in paths parallel to the surfaces of certain plates and adjustable substantially into contact with the surfaces of the plates or into positions at different predetermined heights above said plates.

5. Apparatus of the class described including in its structure a series of refrigerated plates for supporting a product to be frozen, in combination with a leveling member mounted for movement in a path parallel to the surface of one of the plates and adjustable angularly into forwardly and rearwardly inclined relation to the surface of said plate.

6. Apparatus of the class described including in its structure a pair of refrigerated plates arranged one above another, means for advancing a product along the surface of the lower plate in the space between the two plates, and means for scraping frost from the under surface of the adjacent upper plate and returning it to be mixed with the product on the lower plate.

7. Apparatus of the class described including in its structure a pair of refrigerated plates arranged one above another, means for advancing a product along the surface of the lower plate in the space between the two plates, said means acting continuously to rearrange the product on the plate, a scraper for delivering frost to the product from the under surface of the adjacent upper plate, and means for leveling the mixture of product and frost on the lower plate.

8. Apparatus of the class described including in its structure a series of refrigerated plates, means for advancing a product along the surfaces of one plate after another, and means for preventing the product-layer on any plate from exceeding a predetermined thickness.

9. Apparatus of the class described including in its structure a series of refrigerated plates, means for advancing a product along the surfaces of one plate after another, and means for maintaining a predetermined quantity of product on each of the several plates throughout the duration of a run of that product.

10. Apparatus of the class described including in its structure a series of refrigerated plates arranged one above another, means for advancing a product along the surfaces of one plate after another of the series, and means for expanding liquefied carbon dioxide into the space between the plates in such a manner that a part of said carbon dioxide may solidify and become mixed with the product thereon.

11. Apparatus of the class described including in its structure a plurality of refrigerated plates for supporting a mass of product to be frozen, means for leveling the product upon the plates in layers of predetermined thickness, and means movable for freeing the product from the plates, acting also to form in the leveled layers of product an advancing wave and to advance the product itself along the surfaces of the plates.

12. Apparatus of the class described including in its structure a plurality of refrigerated plates for supporting a mass of product to be frozen, leveling means movable above the surfaces of certain plates to reduce the product to layers of predetermined thickness thereon, and scrapers moving in substantial contact with the surfaces of the said plates for freeing the product from the plates, acting also to form advancing waves in the product and also to advance the product itself along the surfaces of said plates.

13. Apparatus for freezing semi-liquid food products, which includes in its organization a refrigerated plate for supporting the product, means for advancing the product along and in direct contact with the plate surface and for intermittently forming the product into irregularly shaped masses thereon, and means, comprising a sweeper blade movable in a path above the plate surface and inclined downwardly and rearwardly with respect to its direction of movement, for forcibly rearranging said masses in a layer in contact with said surface.

14. A process of removing heat from a moist product, including the steps of spreading the product on the upper surface of a refrigerated plate, advancing the product along and in contact with said surface, causing moisture from the product to congeal upon the said upper surface and also upon a refrigerated surface situated above said product, scraping from both the said surfaces congealed moisture from the product, and causing said congealed moisture to become mingled with the product.

15. A process of freezing moisture-containing products, including the steps of spreading the product between two refrigerated surfaces but not in contact with the upper of such surfaces, advancing the product along the lower of said surfaces, meanwhile causing refrigerated gas to circulate between the said refrigerated surfaces and to remove moisture from the product, congealing some of the gas-borne moisture upon the refrigerated surface above the product and thereby partly dehydrating the said gas, removing congealed moisture from said upper surface and causing the said congealed moisture to become mingled with the product being frozen.

16. A process of freezing a mass of food product units, such as shelled peas, which consists in spreading the mass of units on one refrigerated surface and under but not in contact with another refrigerated surface, advancing the product mass along and in contact with the lower of said surfaces, meanwhile scraping from both the said surfaces congealed moisture, causing a portion of said congealed moisture to mingle with, melt and remove heat from the said product until the surfaces of the product units have been lowered to approximately the freezing point of the congealed moisture, and thereafter causing other particles of the congealed moisture removed from the said refrigerating surfaces to become mingled with and to adhere in an unmelted condition to the individual units of the product mass.

17. A process of freezing moist food products, which consists in leveling the product in a layer of predetermined average thickness on a refrigerated surface and then lifting the product from said surface in a limited advancing area thus forming a wave therein, and advancing the product itself along the surface at a slower average rate than that at which the wave progresses.

18. A process of freezing moist food products, which consists in advancing a mass of the product in a layer of substantially uniform average thickness between two parallel refrigerated surfaces, delivering a current of refrigerated and partially dehydrated gas into contact with said layer between said surfaces, and continuously removing congealed moisture from both surfaces and returning it to the product mass being frozen.

19. A process of freezing moisture-containing food products, which consists in advancing a mass of the product in layer formation between two horizontal refrigerated surfaces, continuously scraping congealed moisture from the upper surface, and causing it to drop into the advancing product beneath it.

20. A process of congealing a mass of slushed or partially frozen food product, which consists in forcibly crushing the product down upon a refrigerated surface in layer formation, then intermittently freeing portions of the layer from freezing contact with said surface and advancing the product thereover.

21. Apparatus of the class described including in its structure a refrigerated plate, means for advancing a food product along the surface of said plate, and means arranged to travel in a path parallel to and at a predetermined distance above the surface of said refrigerated plate for leveling the product upon the plate in a layer of predetermined thickness.

22. Apparatus of the class described including in its structure a pair of refrigerated plates arranged one above another, means for advancing the product along the surface of the lower plate in the space between the two plates and without touching the upper plate, and a blade for scraping ice particles from the under surface of said upper plate and returning them to be mixed with the product as it is advanced on the lower plate.

23. Apparatus of the class described including in its structure a series of refrigerated plates each with an opening arranged above the surface of the next lower plate, means for advancing a product along the surface of each plate intermittently toward its opening at a relatively slow rate, and means for carrying product from the location where it is delivered, distributing it in a layer uniformly over the surface of the plate, and carrying excess product ahead at a faster rate of feed than the rate of the layer in contact with the surface of the plate.

24. In apparatus for freezing moisture-containing food products, a refrigerated plate, means for leveling the product upon the plate in a layer of predetermined thickness, said means causing the product in excess of said predetermined layer to move forwardly at relatively high speed, and means for advancing the product layer upon the surface of said plate at a slower rate of speed.

25. A process of freezing moist food products, which includes the steps of advancing the product in a layer of substantially uniform average thickness between two spaced parallel refrigerated surfaces, flowing a current of refrigerated and partially dehydrated gas over said layer and between the refrigerated surfaces thereby continuously removing moisture from the product, and continuously removing congealed moisture from both refrigerated surfaces and returning it to the product to renew the moisture content thereof.

26. A process of freezing moisture-containing food products, which consists in advancing the product in a mass of limited thickness between spaced substantially parallel refrigerated surfaces while in contact with a partially dehydrated atmosphere, scraping congealed moisture from refrigerated surfaces above the product mass, and returning it to the underlying product thus maintaining the aggregate moisture content of the product against substantial reduction during the freezing process.

CLARENCE BIRDSEYE.